(12) United States Patent
Wezyk et al.

(10) Patent No.: US 7,354,104 B2
(45) Date of Patent: Apr. 8, 2008

(54) COMPACT STORABLE SOFT-TOP FOR A MOTOR VEHICLE

(75) Inventors: Wojciech Wezyk, Sindelfingen (DE);
Berthold Klein, Rutesheim (DE);
Thomas Halbweiss, Remseck (DE);
Waleri Katrini, Dresden (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/534,039

(22) Filed: Sep. 21, 2006

(65) Prior Publication Data

US 2007/0063531 A1 Mar. 22, 2007

(30) Foreign Application Priority Data

Sep. 21, 2005 (DE) .................. 10 2005 045 214

(51) Int. Cl.
*B60J 7/11* (2006.01)
*B60J 7/12* (2006.01)
(52) U.S. Cl. ..................................... 296/218; 296/219
(58) Field of Classification Search ............... 296/218, 296/219
See application file for complete search history.

(56) References Cited

U.S. PATENT DOCUMENTS 5,080,428 A * 1/1992 Rouland .................... 296/218
2006/0131919 A1 6/2006 Brockhoff

FOREIGN PATENT DOCUMENTS

| DE | 38 06 647 A1 | 7/1989 | |
|---|---|---|---|
| DE | 40 40 249 C2 | 7/1992 | |
| DE | 101 23 227 A1 | 11/2002 | |
| DE | 102 54 365 A1 | 6/2004 | |
| DE | 103 01 792 A1 | 7/2004 | |
| EP | 491158 * | 6/1992 | ................. 296/218 |
| FR | 2 869 841 | 11/2005 | |

* cited by examiner

*Primary Examiner*—Dennis H Pedder
(74) *Attorney, Agent, or Firm*—Brooks Kushman P.C.

(57) ABSTRACT

A soft-top for a motor vehicle includes a cover and a support frame. The support frame has at least two parts supporting the cover. The at least two parts are movable relative to one another between a clamped position and a folded position such that the support frame is movable between the clamped position in which the support frame is extended with the cover thereon and the folded position in which the support frame is folded with the cover thereon upon. An adjustment device adjusts the at least two parts to move the support frame with the cover thereon between the clamped and the folded positions.

16 Claims, 8 Drawing Sheets

Fig 1

COMPACT STORABLE SOFT-TOP FOR A MOTOR VEHICLE

CROSS-REFERENCE TO RELATED APPLICATIONS

This application claims foreign priority benefits under 35 U.S.C. § 119(a)-(d) to DE 10 2005 045 214.0, filed Sep. 21, 2005, which is hereby incorporated by reference in its entirety.

BACKGROUND OF THE INVENTION

1. Field of the Invention

The present invention relates to a soft-top for a motor vehicle.

2. Background Art

Soft-tops are used for covering and uncovering the interior of a motor vehicle. Soft-tops find application for lightweight sport vehicles whose fabric cover may be completely removed from the vehicle and stowed in the vehicle interior. Certain soft-top systems include a hoop support which clamps the cover. The hoop beam may also be disconnected and stowed separately. Operating such systems is complicated because many different parts must be handled to open the soft-top. Additionally, such soft-tops are securely stowed in the vehicle interior with difficulty on account of the many individual parts.

Certain systems include a rollover cover or Z-fold is used. However, in such systems a relatively large space for the functional parts and the stored soft-top must be reserved in the vehicle. The functional parts are either visible or concealed by a separate flap and/or a cover.

SUMMARY OF THE INVENTION

An object of the present invention is a soft-top which may be folded up as compactly as possible, and which in particular is well suited for short roof lengths.

In carrying out the above object and other objects, the present invention provides a soft-top for a motor vehicle. The soft-top includes a cover and a support frame. The support frame has at least two parts supporting the cover. The at least two parts are movable relative to one another between a clamped position and a folded position such that the support frame is movable between the clamped position in which the support frame is extended with the cover thereon and the folded position in which the support frame is folded with the cover thereon upon. An adjustment device adjusts the at least two parts to move the support frame with the cover thereon between the clamped and the folded positions.

In accordance with an embodiment of the present invention, a cover (i.e., a fabric top) and a support frame of a soft-top are combined into a removable roof module. For stowing the soft-top, the entire roof module is advantageously folded up and stowed as a single part in the vehicle interior. The roof module has an adjustment device for adjusting at least two parts of the support frame which are displaceable relative to one another. This allows the soft-top to be adjusted between a clamped position and a folded position.

The adjustment device for the roof module is independent of the rest of the vehicle. That is, the adjustment device is not undetachably connected to the vehicle. The roof module is fixed to the vehicle body by additional detachable fixing elements such as eyes and locking hooks which engage therein. From the clamped position spanning the roof area, the fabric top and the support frame may be easily folded up into the compact folded position by the adjustment device. The folding or unfolding operation may be performed manually and/or via a mechanical drive.

The roof module may be removed as a whole from the vehicle. Preferably, the roof module is first removed from the vehicle and then conveniently folded up separately from the vehicle and compactly stowed. For example, the roof module is stowed in the trunk of the vehicle.

Optionally, the roof module is first partially folded up provided that the roof module is still situated on the vehicle. The already partially folded and comparatively compact roof module may then be removed more easily from the vehicle.

In an embodiment of the present invention, the adjustment device has at least one swivel bearing extending in the longitudinal direction of the vehicle. In this manner, the roof package may be folded in the middle, for example, thereby reducing its surface area by half. One or two parallel swivel bearings extending in the longitudinal direction may also be provided. Thus, for example, in each case the soft-top may be swivelled in laterally so that its surface area is likewise reduced, for example to one-half or one-third. It is possible to additionally or exclusively provide a swivel bearing extending in the transverse direction. The roof package which has already been folded up may be folded once more in the transverse direction, thereby reducing the area by approximately half once again. The roof module multiply folded in this manner is particularly compact, and may therefore be advantageously stowed in a storage location such as in the trunk or outside the vehicle.

In an embodiment of the present invention, the roof module has at least one spatial guide rod for superposing at least two parts of the support frame. The at least one spatial guide rod may include a four-bar kinematic linkage. It is possible by use of the four-bar kinematic linkage to produce a sliding-lifting motion of two adjacent parts of the support frame thereby sliding the individual parts of the support frame over one another. In this manner the surface area of the roof module may likewise be correspondingly reduced. The four-bar kinematic linkage also results in a particularly compact folding of the soft-top. Optionally, a plurality of such four-bar kinematic linkages may be provided. For example, it is possible to move parts of the support frame, running to the left or the right viewed in the vehicle longitudinal direction, in a sliding-lifting motion above and/or underneath a center part of the support frame. This measure as well results in a particularly compactly folded and therefore easily stowable roof module for the soft-top.

An embodiment of the present invention includes a drive for automatically adjusting the soft-top. The corresponding folding of the soft-top without manual force may also be carried out.

An embodiment of the present invention includes at least one actuating element for manually locking and unlocking the soft-top. Folding of the roof module may thus be initiated by actuating the actuating element. The soft-top may also be locked in its clamped position in such a way that unintentional folding is prevented.

The above features, and other features and advantages of the present invention are readily apparent from the following detailed descriptions thereof when taken in connection with the accompanying drawings.

BRIEF DESCRIPTION OF THE DRAWINGS

FIG. 1 illustrates a perspective view of a motor vehicle, seen at an angle from above, having a soft-top which may be longitudinally and transversely folded in accordance with an embodiment of the present invention;

FIGS. 12 and 13 illustrate an embodiment of a foldable soft-top in the clamped position and in the folded position, respectively, two side parts viewed in alignment with the vehicle being displaceable over one another in a sliding-lifting motion toward the center of the vehicle.

DETAILED DESCRIPTION OF THE PREFERRED EMBODIMENT(S)

Figure 1:
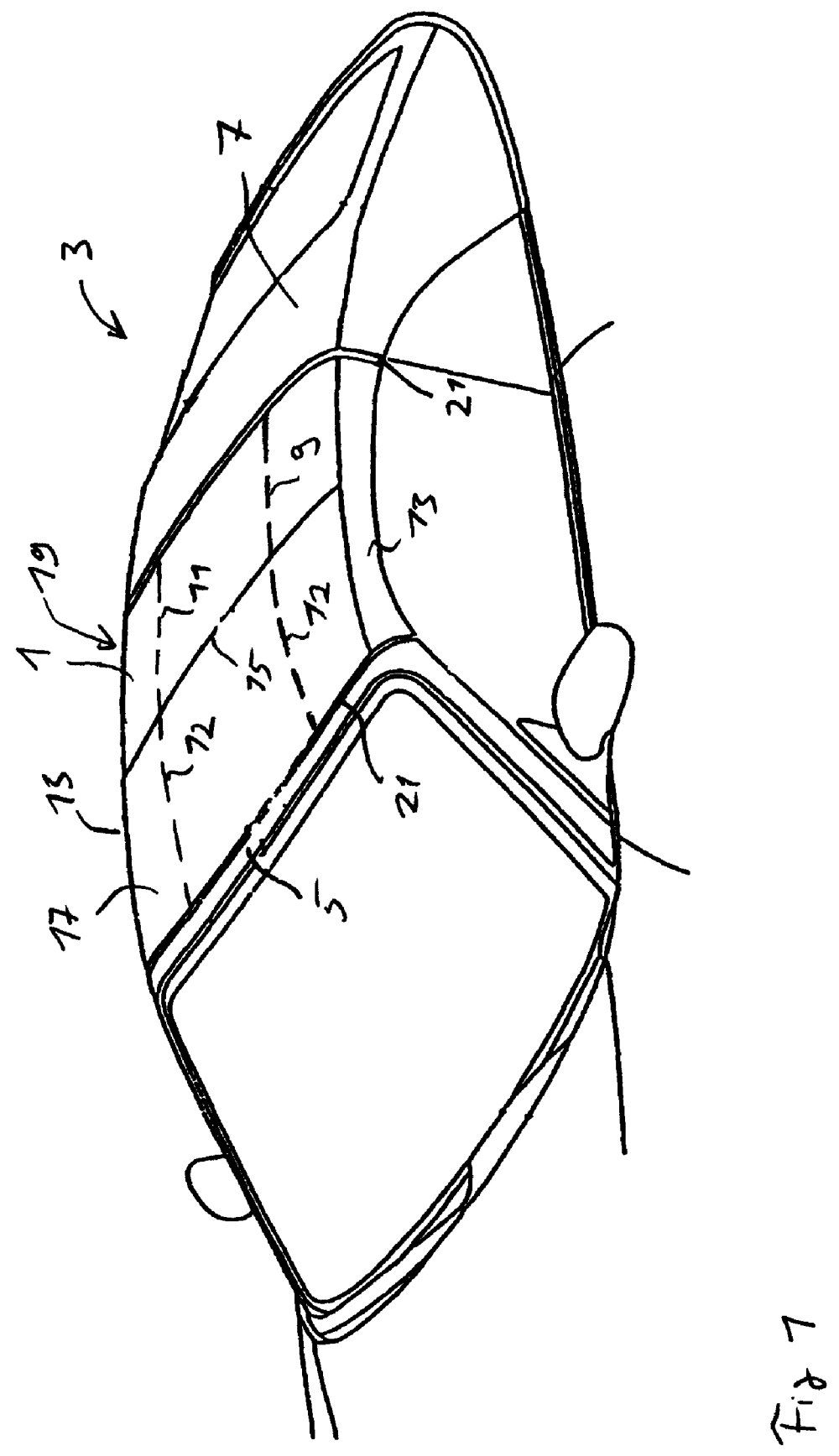
Figure 2:
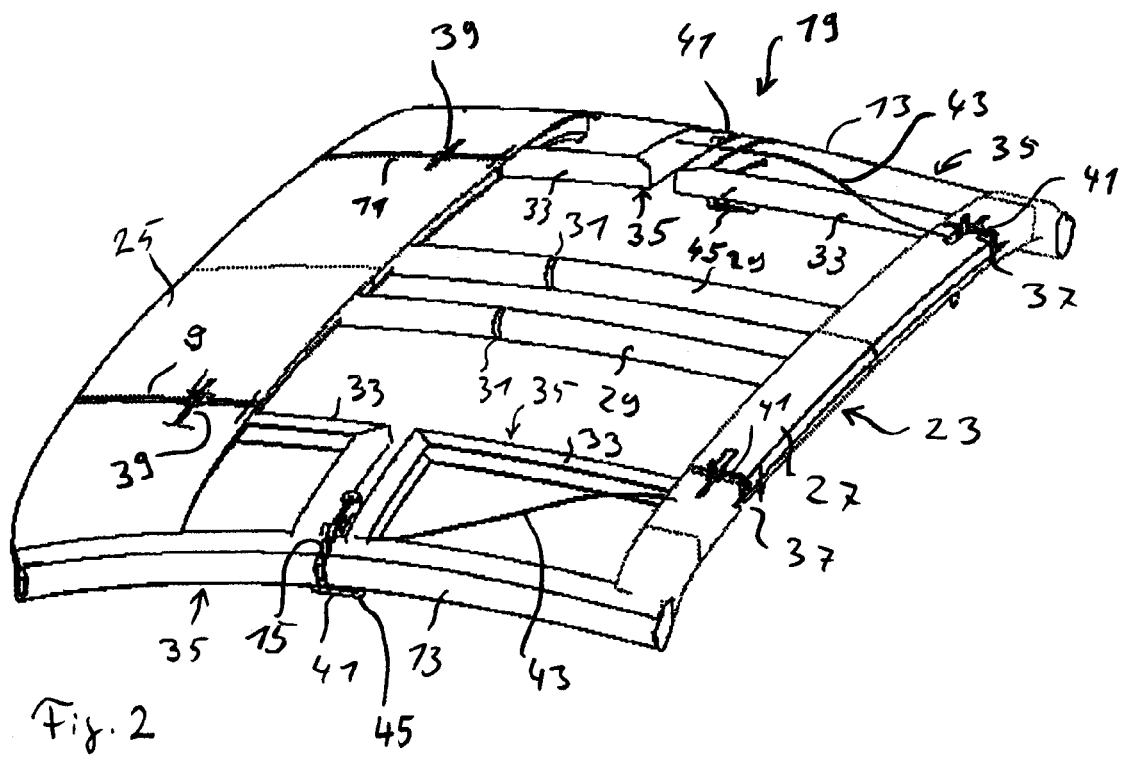
FIG. 2 illustrates a perspective view of the soft-top seen at an angle from the rear without a cover.

Referring now to FIG. 1, a perspective view of a motor vehicle 3, seen at an angle from above, in accordance with an embodiment of the present invention is shown. Vehicle 3 includes a soft-top 1 which may be longitudinally and transversely folded. FIG. 1 illustrates soft-top 1 in a closed state in which the soft-top extends over the roof plane of vehicle 3 to thereby cover the vehicle interior. In the closed position, soft-top 1 is mounted, similarly as for a Targa roof, between a windshield transverse frame 5 and a rear window transverse frame 7 of vehicle 3.

Soft-top 1 may be folded about two longitudinally extending swivel axes 9, 11. Swivel axes 9, 11 run in the longitudinal direction (indicated by dashed line 12) of vehicle 3. Soft-top 1 includes longitudinally extending side beams 13. Longitudinal side beams 13 may be swivelled upward in the direction of the center of vehicle 3 about longitudinal swivel axes 9, 11, so that the side beams come to rest approximately at the center of vehicle 3.

Soft-top 1 may also be folded about a transversely extending swivel axis 15 running transverse to the longitudinal direction of vehicle 3. The folding about transverse swivel axis 15 preferably is performed after longitudinal side beams 13 have been folded in about longitudinal swivel axes 9, 11. Thus, completely folding soft-top 1 requires a total of three swivel operations about swivel axes 9, 11, 15. Soft-top 1 may preferably be removed from vehicle 3. Soft-top 1 may optionally be folded by use of manual force in the dismounted state of soft-top 1. The triply folded soft-top 1 may then be stowed in a trunk of vehicle 3.

Referring now to FIG. 2, with continual reference to FIG. 1, soft-top 1 includes a fabric cover 17 fixedly connected to a support frame 23. Support frame 23 is used for clamping cover 17 and correspondingly for folding soft-top 1. Cover 17 and support frame 23 are combined into a roof module 19. Roof module 19 includes cover 17 and support frame 23 situated beneath cover 17 including longitudinal side beams 13. Roof module 19 includes additional functional elements of soft-top 1, such as corresponding seals 21 and corresponding swivel bearings for swivel axes 9, 11, 15.

FIG. 2 shows soft-top 1 without cover 17. Roof module 19 has support frame 23. Support frame 23 includes longitudinal side beams 13. Longitudinal side beams 13 are connected to one another via a front transversely extending hoop support 25 and a rear transversely extending hoop support 27. Hoops supports 25, 27 run transversely to the longitudinal direction of vehicle 3. Hoop supports 25, 27 are associated with one another approximately in the center of vehicle 3 by two longitudinally extending center beams 29. Longitudinal center beams 29 run approximately parallel to longitudinal swivel axes 9, 11, to the left and right of the center of vehicle 3. Longitudinal center beams 29 each have two parts which are associated with one another via a gap 31. A corresponding plug-in connection or centering element may optionally be provided in the region of gap 31. As such, in the clamped state of soft-top 1 as illustrated in FIG. 2, two continuous longitudinal center beams 29 result which are protected against tilting and sliding. Longitudinal center beams 29, similarly as for longitudinal side beams 13 and transverse hoop supports 25, 27, are also used for clamping cover 17.

For bracing and likewise for clamping cover 17, transverse hoop supports 25, 27 as well as longitudinal side beams 13 have reinforcing frames 33. Reinforcing frames 33 are each mounted in the corners of soft-top 1 at which each of transverse hoop supports 25, 27 and a longitudinal side beam 13 abut one another. In each case reinforcing frames 33 together with the respective parts of transverse hoop supports 25, 27 and longitudinal side beams 13 thus form a rectangle 35. Rectangle 35 is preferably a tension-frame rectangle 35 designed for stabilization and for clamping cover 17.

Longitudinal swivel axes 9, 11 each have rear and front hinges 37 and 39, respectively. Rear and front hinges 37, 39 allow longitudinal side beams 13 to correspondingly swivel upward toward the center of vehicle 3. Rear hinges 37 arrest the swivel motion of longitudinal side beams 13 about longitudinal swivel axes 9, 11 in the clamped position, as illustrated in FIG. 2, of soft-top 1. Rear hinges 37 for support frame 23 may be designed for preventing unintentional unfolding of soft-top 1.

Support frame 23 and longitudinal side beams 13 have hinges 41. Hinges 41 enable the folding up of support frame 23 about transverse swivel axis 15. Hinges 41 are associated with rear hinges 37 of rear transverse hoop support 27 by a mechanical force coupling 43. Mechanical force coupling 43, for example, is a shaft, Bowden cable, or the like. Rear hinges 37 of rear transverse hoop support 27 may be locked by force coupling 43. It is thus possible to likewise lock and unlock hinges 41 of longitudinal side beams 13 as well as rear hinges 37 of rear transverse hoop support 27 by an actuating element 45. For this purpose, hinges 41, 37 have corresponding mechanical locking and unlocking devices. The locking or unlocking may also be optionally performed by an electro-mechanical device or by a drive. Soft-top 1 may thus be preferably locked and unlocked, if needed, at least in the clamped position and the folded position.

FIGS. 3, 4, 5, and 6 respectively illustrate parts of a folding operation for soft-top 1 by hinges 37, 39, 41 of longitudinal side beams 13, transverse center beams 29, and transverse hoop supports 25, 27 of support frame 23. FIGS. 3, 4, 5, and 6 each show support frame 23 in a perspective three-dimensional illustration, seen at an angle from above. The folding operation for soft-top 1 is explained in greater detail below with reference to FIGS. 3, 4, 5, and 6.

Figure 3:
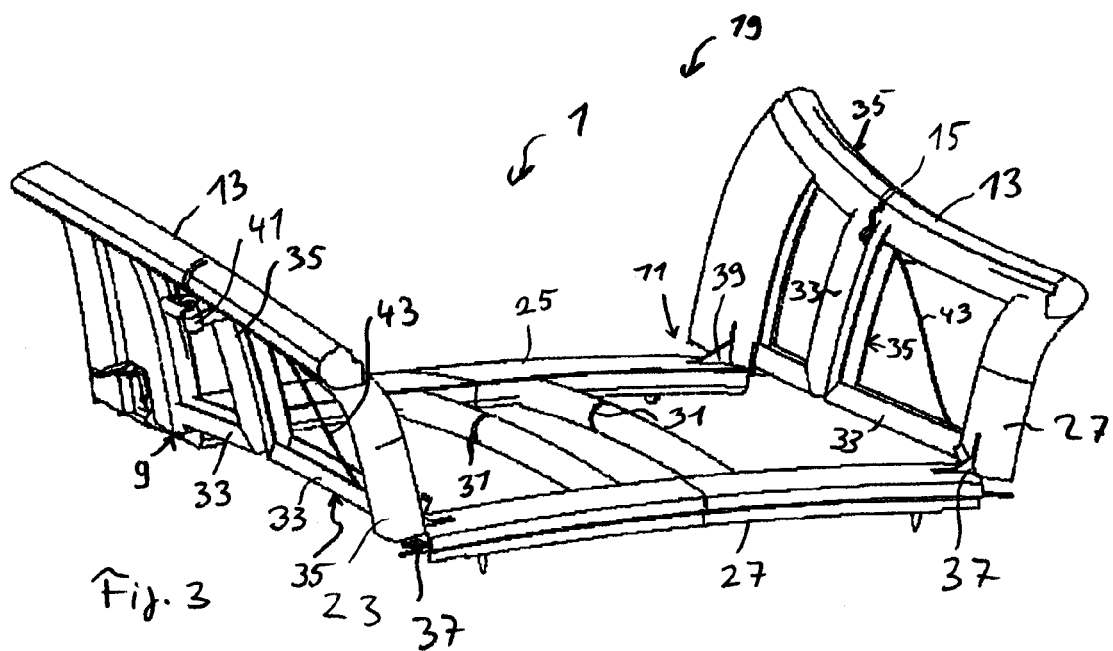
FIG. 3 illustrates the soft-top partially folded on both longitudinal sides.

As seen in FIG. 3, longitudinal side beams 13 and parts of transverse hoop supports 25, 27, which essentially are parts of tension-frame rectangles 35, are swivelled upward about longitudinal swivel axes 9, 11. FIG. 3 shows a position of longitudinal side beams 13 after being swivelled by approximately 90°.

Figure 4:
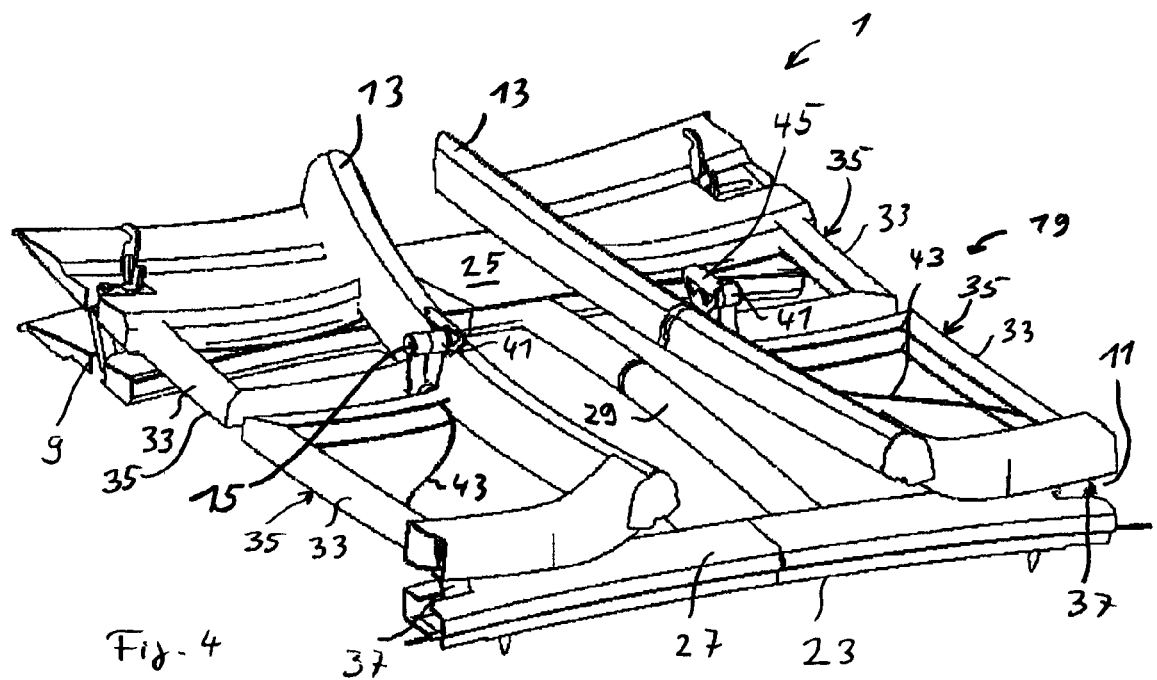
FIG. 4 illustrates the soft-top completely folded twice in the longitudinal direction.

FIG. 4 shows a position of support frame 23 in which tension-frame rectangles 35 of support frame 23 have been swivelled upward completely in the direction of the center of vehicle 3 about longitudinal swivel axes 9, 11, i.e., by approximately 180°. It can be seen that the surface area of soft-top 1 has thus been reduced by approximately one-half. The swivel motion occurs with guiding by hinges 37, 39 of rear transverse hoop support 27 and front transverse hoop support 25, respectively.

Figure 5:
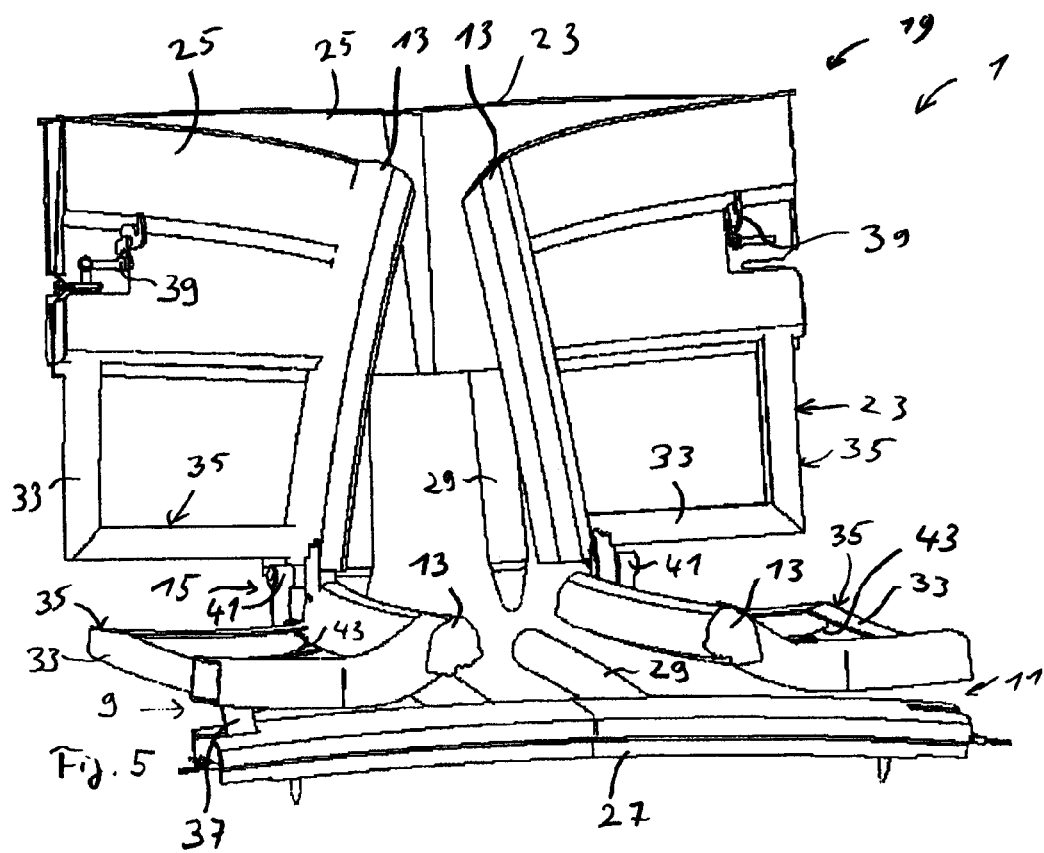
FIG. 5 illustrates the soft-top with an additional partial transverse fold.

Starting from the position of support frame 23 as illustrated in FIG. 4, support frame 23 may also be swivelled about transverse swivel axis 15, formed by hinges 41 of longitudinal side beams 13, by approximately 180°. FIG. 5 shows an intermediate position with a swivel motion of approximately 90°.

Figure 6:
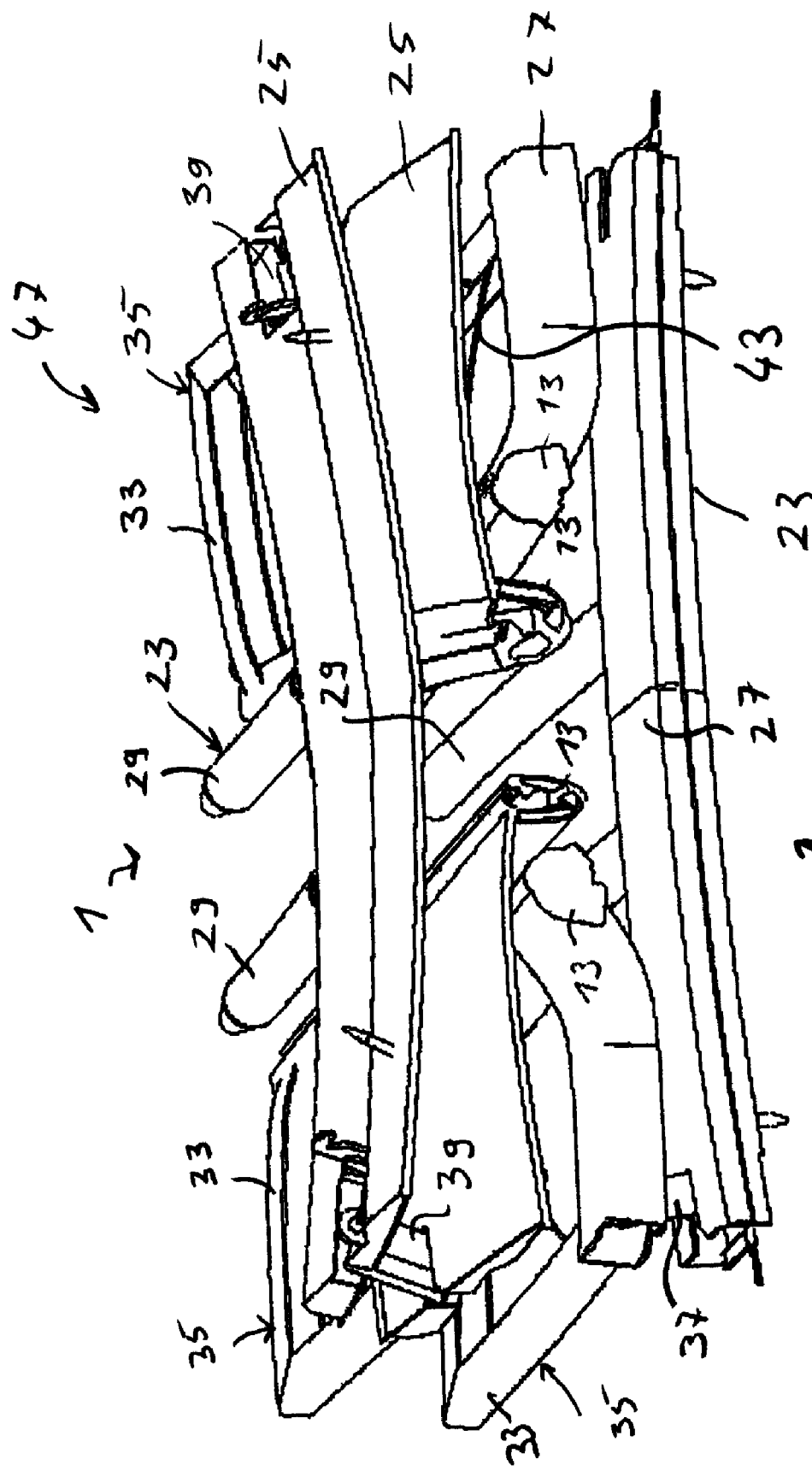
FIG. 6 illustrates the soft-top with an additional complete transverse fold.

FIG. 6 illustrates support frame 23 in a completely folded-up position. The swivel motion about transverse swivel axis 15 has been performed completely, i.e., by approximately 180°. It can be seen that the surface area of roof module 19 has thus been reduced by half once again. Cover 17 is also folded corresponding to the motions of hinges 37, 39, 41, and may be folded up, for example, between the corresponding tension-frame rectangles 35. An extremely compact roof package 47 is obtained, as seen in FIG. 6. Roof package 47 is reduced in both its longitudinal and transverse dimensions in such a way that it may be easily and conveniently stowed, for example in a trunk or inside vehicle 3. Optionally, roof package 47 may be stored separately from vehicle 3, for example to install a Targa hardtop instead of soft-top 1.

Figure 7:
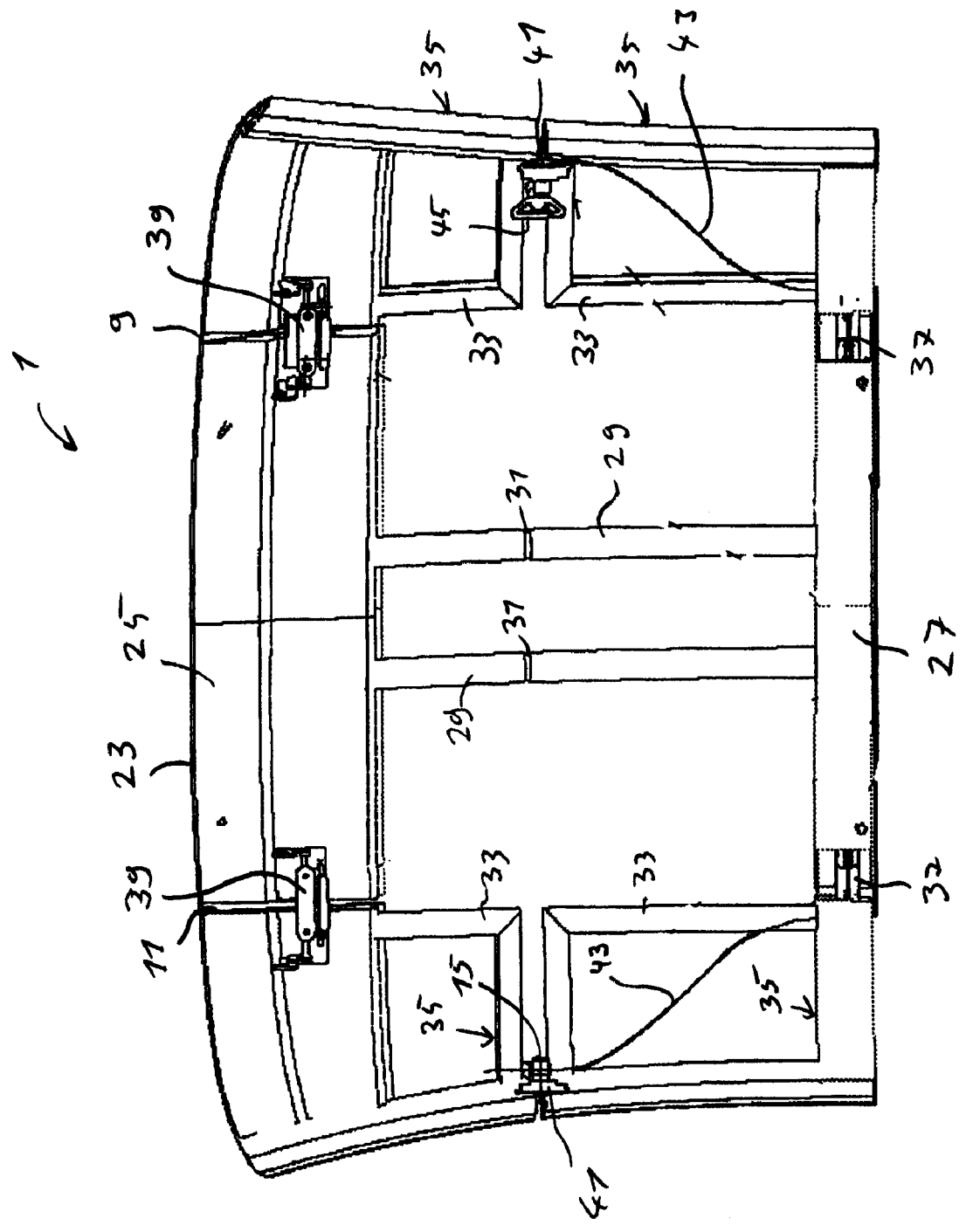
FIG. 7 illustrates a view of the soft-top from below.

FIG. 7 shows soft-top 1 in a planar illustration viewed from below, i.e., from the interior of vehicle 3 looking upwards. Actuating element 45 for hinge 41, which is associated with rear hinges 37 by force coupling 43, is visible. Rear hinges 37 may optionally be connected to one another by another force coupling, thus enabling a transmitted actuating motion of actuating element 45 to be further transmitted from rear hinges 37 to hinge 41 of left longitudinal side beam 13, seen on the left in FIG. 7. Left hinge 41 of left longitudinal side beam 13 may advantageously be designed without actuating element 45, as illustrated in FIG. 7. The actuation of actuating element 45 is transmitted via force couplings 43 and the force coupling of rear hinges 37 of rear transverse hoop support 27 to left hinge 41 of longitudinal side beam 13, i.e., to all the hinges 41 and 37.

Figure 8:
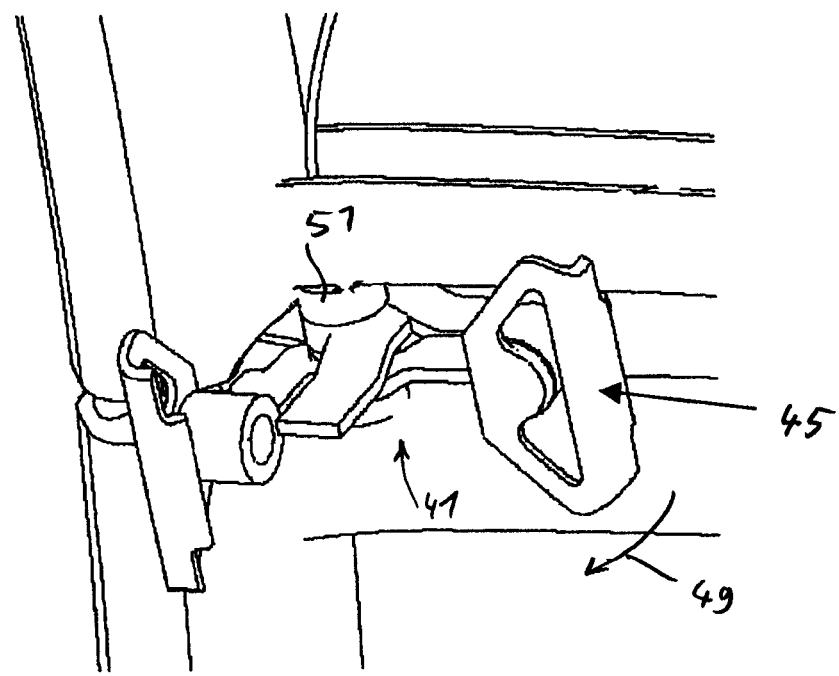
FIG. 8 illustrates a detailed view of an actuating and locking element for the soft-top.

FIG. 8 shows a detailed illustration of hinge 41 together with actuating element 45 in a three-dimensional view seen at an angle from below. FIG. 8 shows actuating element 45 in a locked position. From the locked position illustrated in FIG. 8, actuating element 45 may be swivelled about a swivel axis 51 in such a way that the desired unlocking of hinges 41 and 37 is achieved. The swivel motion for unlocking is indicated by an arrow 49.

Figure 9:
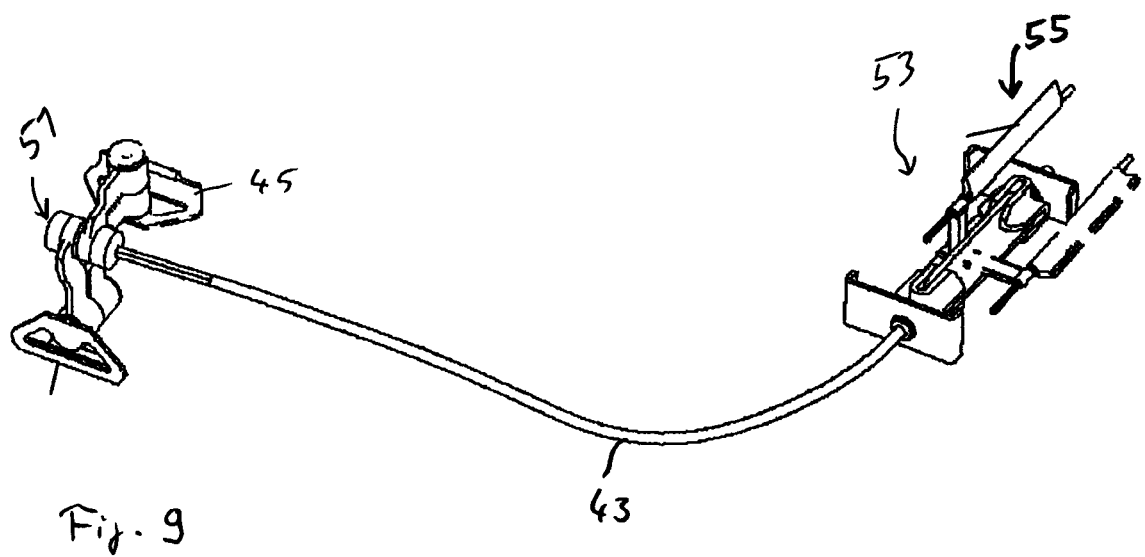
FIG. 9 illustrates a further detailed view of the actuating and locking element coupled to a lock for the soft-top.

FIG. 9 shows hinge 41 together with actuating element 45 coupled to a locking device 53 via force coupling 43, in a free-form illustration. Locking device 53 is associated with hinge 41 via force coupling 43. Locking device 53 is also associated with the hinges 37 via additional force couplings 55, only partially illustrated in FIG. 9. Locking device 53 is designed such that it locks or unlocks hinges 37 by actuating actuating element 45 and force couplings 43 and 55.

Figure 10:
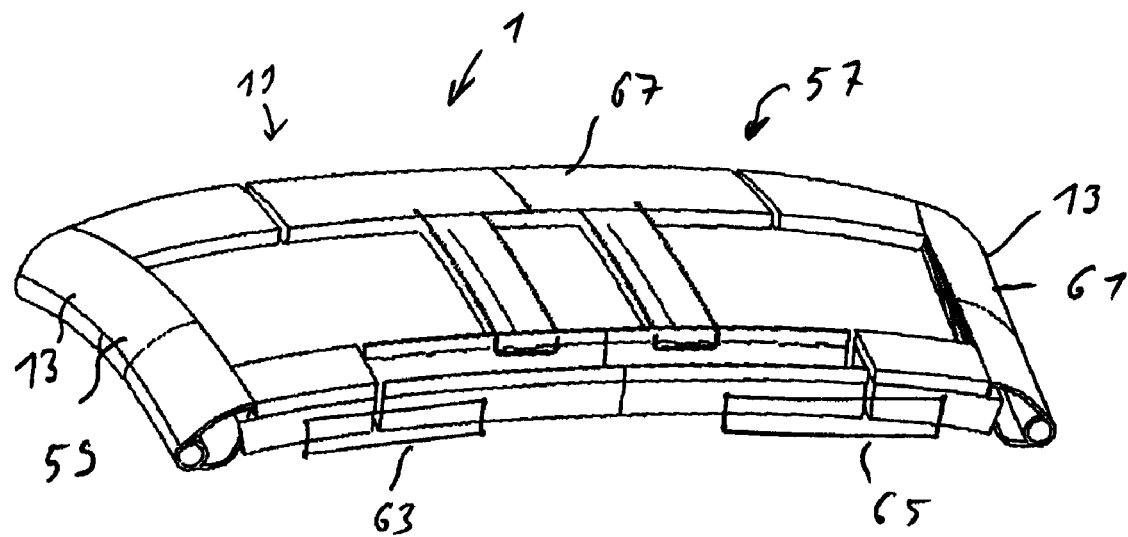
FIGS. 10 and 11 illustrate an embodiment of a foldable soft-top in a clamped position and in a folded position, respectively, two laterally positioned parts being displaceable in a sliding-lifting motion underneath a center part of the soft-top.
Figure 11:
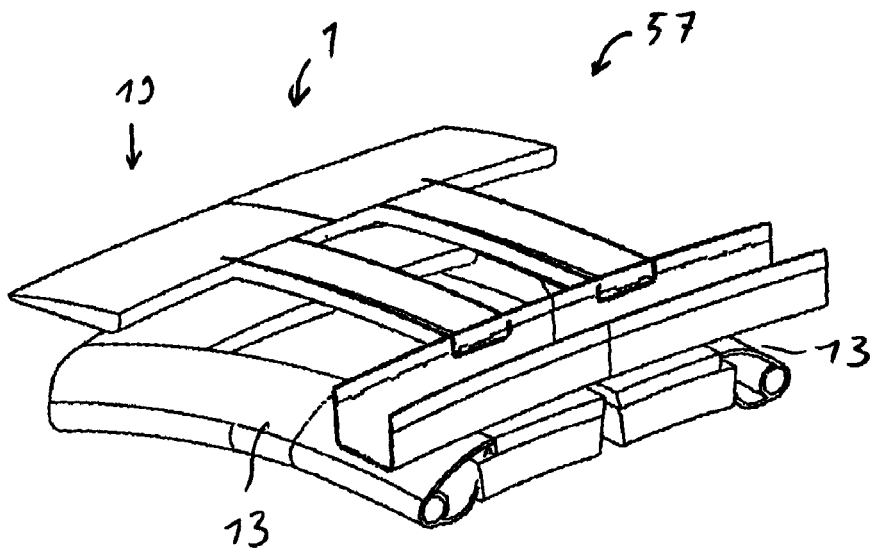
Figure 72:
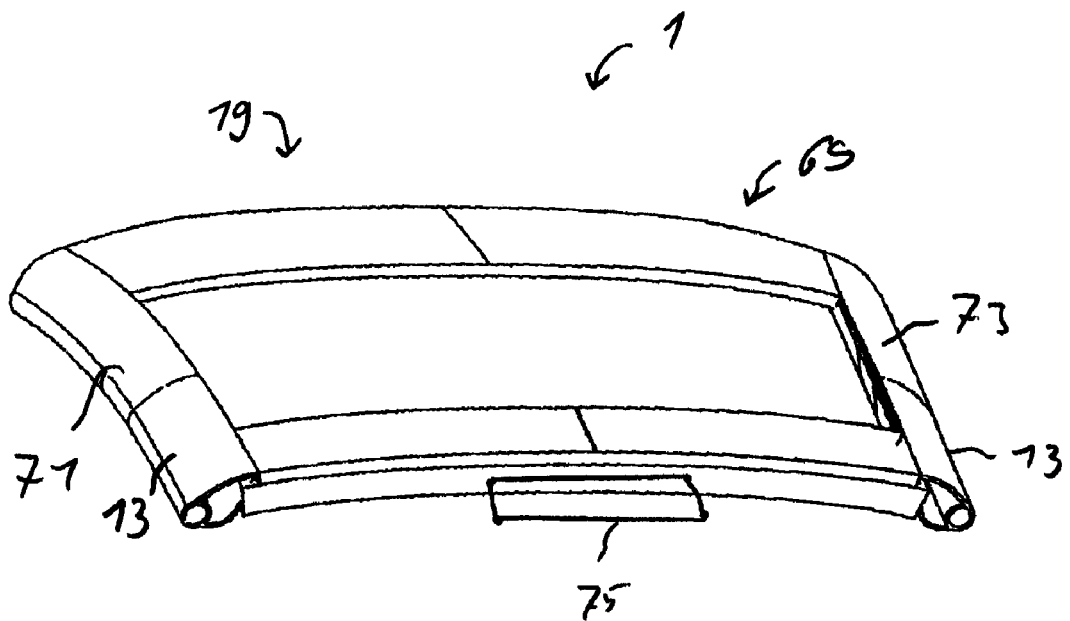
Figure 73:
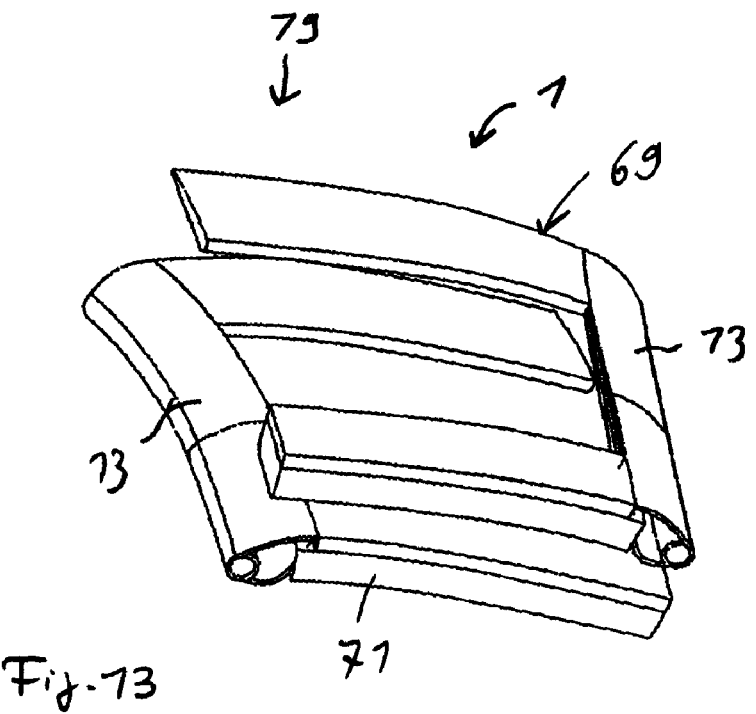

FIGS. 10 and 11 show an embodiment of soft-top 1 having a support frame 57. First and second side parts 59, 61 of support frame 57 are respectively movable by first and second four-bar kinematic linkage 63, 65 (schematically indicated in FIG. 10) in a sliding/lifting motion underneath a center part 67 of support frame 57. First four-bar kinematic linkage 63 is associated with first side part 59 and center part 67. Second four-bar kinematic linkage 65 is associated with second side part 61 and center part 67.

FIG. 11 shows support frame 57 in the completely folded-up position, with side parts 59, 61 located opposite one another directly beneath center part 67. A drive may optionally be provided for four-bar kinematic linkages 63, 65. It is also possible to position one of side parts 59, 61 above and one beneath center part 67.

FIGS. 12 and 13 show an embodiment of soft-top 1 having a support frame 69. Support frame 69 has two side parts 71, 73. Side parts 71, 73 may be placed flat one above the other in a sliding-lifting motion by a four-bar kinematic linkage 75 (schematically indicated in FIG. 12) or by another suitable mechanism. This functional position, which corresponds to the folded position of soft-top 1, is shown in FIG. 13. A left side part 71 is situated beneath a right side part 73 of support frame 69.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A soft-top for a motor vehicle comprising:
    a fabric cover; and
    a support frame having a center part and first and second side parts supporting the cover, wherein the first side part is foldable about a first longitudinal axis to move between a clamped position in which the first side part extends from a first side portion of the center part and a folded position in which the first side part folds over the first side portion of the center part, the second side part is foldable about a second longitudinal axis to move between a clamped position in which the second side part extends from a second side portion of the center part and a folded position in which the second side part folds over the second side portion of the center part, and the center part with the folded side parts are foldable about a transverse axis to move to a folded position in which the center part with the folded side parts are folded such that the support frame is extended with the cover thereon when the side parts are in their clamped positions and the support frame is folded with the cover thereon upon when the center and side parts are in their folded positions.

2. The soft-top of claim 1 wherein:
    the support frame includes first and second longitudinally extending swivel bearings for enabling the first and second side parts to be respectively foldable about the first and second longitudinal axes.

3. The soft-top of claim 1 wherein:

the support frame includes a transversely extending swivel bearing for enabling the center part with the folded side parts to be foldable about the transverse axis.

4. A soft-top for a motor vehicle comprising:

a cover;

a support frame having at least two parts supporting the cover, the at least two parts of the support frame being movable relative to one another between a clamped position and a folded position such that the support frame is movable between the clamped position in which the support frame is extended with the cover thereon and the folded position in which the support frame is folded with the cover thereon upon; and an adjustment device for adjusting the at least two parts of the support frame to move the support frame with the cover thereon between the clamped and the folded positions, wherein the adjustment device includes two longitudinally extending swivel bearings and a transversely extending swivel bearing, the support frame with the cover thereon being foldable first about the longitudinal swivel bearings and then foldable about the transverse swivel bearing.

5. The soft-top of claim 4 further comprising:

at least one spatial guide rod for superposing the at least two parts of the support frame.

6. The soft-top of claim 5 wherein:

the at least one spatial guide rod includes at least one four-bar kinematic linkage.

7. The soft-top of claim 5 wherein:

the at least two parts of the support frame include a first side part, a second side part, and a center part;

wherein the support frame includes a first four-bar kinematic linkage associated with the first side part and the center part and a second four-bar kinematic linkage associated with the second side part and the center part.

8. The soft-top of claim 7 wherein:

the first and second side parts are displaceable toward the center of the vehicle underneath the center part by the two four-bar kinematic linkages.

9. The soft-top of claim 1 further comprising:

at least one actuating element for manually locking and unlocking the support frame with the cover thereon in the clamped position.

10. The soft-top of claim 1 wherein:

the support frame with the cover thereon is connected to the vehicle when the support frame is in the clamped position.

11. The soft-top of claim 1 wherein:

the support frame with the cover thereon is disconnected from the vehicle when the support frame is in the folded position such that the support frame with the cover thereon may be removed from the vehicle for storage.

12. The soft-top of claim 4 wherein:

the at least two parts of the support frame include a longitudinally extending side beam, a first transversely extending hoop support, and a second transversely extending hoop support.

13. The soft-top of claim 4 wherein:

the at least two parts of the support frame include first and second side parts and a center part.

14. The soft-top of claim 4 wherein:

the at least two parts of the support frame include left and right side parts.

15. The soft-top of claim 4 further comprising:

at least one actuating element for manually locking and unlocking the support frame with the cover thereon in the clamped position.

16. The soft-top of claim 4 wherein:

the support frame with the cover thereon is disconnected from the vehicle when the support frame is in the folded position such that the support frame with the cover thereon may be removed from the vehicle for storage.

* * * * *